United States Patent
Gupta et al.

(10) Patent No.: US 11,381,941 B2
(45) Date of Patent: Jul. 5, 2022

(54) DYNAMIC PERMIT/DENY UE/REALM LIST UPDATE AND COST OPTIMIZATION BASED ON NETWORK ATTACH FAILURE INCIDENTS

(71) Applicant: Cisco Technology, Inc., San Jose, CA (US)

(72) Inventors: Arindam Gupta, Karnataka (IN); Tara Khoiwal, Gujarat (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 84 days.

(21) Appl. No.: 17/069,095

(22) Filed: Oct. 13, 2020

(65) Prior Publication Data

US 2022/0116752 A1 Apr. 14, 2022

(51) Int. Cl.
  *H04W 4/24* (2018.01)
  *H04W 76/18* (2018.01)
  *H04W 48/00* (2009.01)
  *H04W 48/16* (2009.01)
  *H04L 9/40* (2022.01)

(52) U.S. Cl.
  CPC ........... *H04W 4/24* (2013.01); *H04L 63/0892* (2013.01); *H04W 48/16* (2013.01); *H04W 48/17* (2013.01); *H04W 76/18* (2018.02)

(58) Field of Classification Search
  CPC ....... H04W 4/24; H04W 48/16; H04W 48/17; H04W 76/18; H04L 63/0892
  See application file for complete search history.

(56) References Cited

U.S. PATENT DOCUMENTS

| 7,975,262 | B2 | 7/2011 | Cozmei |
| 8,493,870 | B2 | 7/2013 | Calippe et al. |
| 9,389,992 | B2 | 7/2016 | Gataullin et al. |
| 9,772,927 | B2 | 9/2017 | Gounares et al. |
| 9,860,151 | B2 | 1/2018 | Ganichev et al. |

(Continued)

OTHER PUBLICATIONS

Yangyang Wang et al., "A tool for tracing network data plane via SDN/OpenFlow", Science China Press and Springer-Verlag Berlin Heidelberg 2016, vol. 60 022304:1-022304:13, doi: 10.1007/s11432-015-1057-7, Feb. 2017, 13 pages.

(Continued)

*Primary Examiner* — Diane D Mizrahi
(74) *Attorney, Agent, or Firm* — Edell, Shapiro & Finnan, LLC

(57) ABSTRACT

A method is performed by a control center that resides in a home network. Upon receiving, from access networks, attach requests from user equipments (UEs) when the UEs attempt to connect to the access networks, the control center computes a baseline attach failure rate for the attach requests. The control center initially sets a billing type for a UE of a subscriber to usage based billing. Upon receiving, from the access networks, attach requests from the UE when the UE attempts to connect to the access networks, the control center computes an individual attach failure rate for fulfilling the attach requests from the UE. The control center determines whether the individual attach failure rate for the UE exceeds the baseline attach failure rate. When the individual attach failure rate exceeds the baseline attach failure rate, the control center automatically switches the billing type for the UE to flat rate billing.

20 Claims, 8 Drawing Sheets

(56) References Cited

U.S. PATENT DOCUMENTS

| | | |
|---|---|---|
| 10,567,245 B1 | 2/2020 | Patil et al. |
| 2003/0112800 A1 | 1/2003 | Grech et al. |
| 2006/0009213 A1* | 1/2006 | Sturniolo ............ H04W 8/02 455/432.1 |
| 2010/0241478 A1 | 9/2010 | Sahinoglu |
| 2012/0100832 A1 | 4/2012 | Mao et al. |
| 2013/0232433 A1 | 9/2013 | Krajec et al. |
| 2013/0294257 A1 | 11/2013 | Gonzalez de Langarica et al. |
| 2015/0039747 A1 | 2/2015 | Meloche |
| 2015/0242619 A1 | 8/2015 | Bender et al. |
| 2016/0006840 A1 | 1/2016 | Wenig et al. |
| 2016/0112847 A1 | 4/2016 | Hyytiainen |
| 2016/0147578 A1 | 5/2016 | Biesack |
| 2016/0219065 A1 | 7/2016 | Dasgupta et al. |
| 2016/0255050 A1 | 9/2016 | Grayson et al. |
| 2017/0012790 A1 | 1/2017 | Leemet et al. |
| 2017/0118616 A1 | 4/2017 | Kothari et al. |
| 2017/0126475 A1 | 5/2017 | Mahkonen et al. |
| 2017/0279835 A1 | 9/2017 | Di Pietro et al. |
| 2018/0019931 A1 | 1/2018 | Jalan et al. |
| 2018/0139086 A1 | 5/2018 | Chakraborty et al. |
| 2018/0191471 A1 | 7/2018 | Elhaddad et al. |
| 2018/0270134 A9 | 9/2018 | Bansal et al. |
| 2018/0278751 A1 | 9/2018 | Stepanian |
| 2018/0295659 A1 | 10/2018 | Shan |
| 2020/0280499 A1 | 9/2020 | Santosh et al. |

OTHER PUBLICATIONS

J. Heinanen et al., "A Single Rate Three Color Marker", Network Working Group, Request for Comments: 2697, Category: Informational, Sep. 1999, 6 pages.

Sergio López Álvarez, "Anomaly Detection and Root Cause Analysis for LTE Radio Base Stations", Degree Project in Computer Science and Engineering, Second Cycle, 30 Credits Stockholm, Sweden 2018, Jul. 1, 2018, 56 pages.

3GPP Organizational Partners, "3rd Generation Partnership Project; Technical Specification Group Services and System Aspects; Telecommunication management; Subscriber and equipment trace; Trace data definition and management (Release 15)", 3GPP TS 32.423 V15.0.0, Jun. 2018, 93 pages.

3GPP Organizational Partners, "3rd Generation Partnership Project; Technical Specification Group Core Network and Terminals; General Packet Radio System (GPRS) Tunnelling Protocol User Plane (GTPv1-U) (Release 15)", 3GPP TS 29.281 V15.4.0, Sep. 2018, 32 pages.

Martin Grill et al., "Targeted Network Anomaly Detection", Technical Disclosure Commons Defensive Publications Series, Jul. 11, 2018, 7 pages.

* cited by examiner

300

THE FOLLOWING UEs/SIMs HAVE BEEN DETECTED WITH MULTIPLE AUTHENTICATION/AUTHORIZATION FAILURES OVER A PERIOD OF TIME, PLEASE REVIEW THIS LIST AND TAKE THE RECOMMENDED ACTIONS.

| ANOMALOUS UEs/SIMs | OPERATOR NAME/ID | ENTERPRISE NAME/ID | CAUSE OF FAILURE | RECOMMENDED ACTIONS |
|---|---|---|---|---|
| 310650636044996, 310650636044999, 310650636044909, ... | XYZ/1000000 | ABC/100012048 | WRONG CREDENTIALS | PLEASE REVIEW USER CREDENTIALS OF THESE UEs ON BOTH DEVICE SIDE AS WELL AS CC SIDE, IF THERE ARE ANY MISMATCHES RESET THE CREDENTIALS. ALSO PLEASE CHECK PASSWORDS ARE ENCRYPTED WITH CORRECT ALGORITHM, PLEASE REACH OUT TO CC SUPPORT TEAM FOR ANY FURTHER RESOLUTION. IF THESE ARE INVALID OR UNUSED DEVICES THEN PLEASE REMOVE FROM THE SYSTEM, THESE DEVICES WILL BE PUT INTO RESTRICTED LIST, WON'T BE ALLOWED TO ESTABLISH DATA SESSION AFTER FEW MORE REMINDERS. |
| 310650636044996, 310650636044999, 310650636044909, ... | XYZ/1000000 | EFG/100012050 | INACTIVE DEVICE | PLEASE CHECK STATE OF THE DEVICE IN CC, AS WELL AS IN HSS/HLR, DEVICE SHOULD BE IN ACTIVE STATE TO BE ABLE TO ESTABLISH DATA SESSION. ALSO PLEASE CHECK ON THE GGSN/SGSN SIDE THE STATE OF THESE DEVICES. |

FIG.3

THE FOLLOWING UEs/SIMs HAVE BEEN DETECTED WITH MULTIPLE AUTHENTICATION/AUTHORIZATION FAILURES OVER A PERIOD OF TIME, PLEASE REVIEW THIS LIST AND TAKE THE RECOMMENDED ACTIONS.

| ANOMALOUS UEs/SIMs | CAUSE OF FAILURE | RECOMMENDED ACTIONS |
|---|---|---|
| 410650636044996, 410650636044999, 410650630644909, ... | DEVICE NOT FOUND | PLEASE REVIEW THE LIST OF UEs, THESE ARE NOT FOUND IN CC, SO DO NOT BELONG TO ANY OPERATOR/ENTERPRISE. AS PER THE NUMBERS, THESE CAN BE POTENTIALLY BELONG TO OPERATOR XYZ WITH MCC, MNC NUMBER. PLEASE CROSS CHECK ON CC HLR/HSS SYSTEM AND AFTER REVIEW REACH OUT TO THE SUGGESTED OPERATOR AS NEEDED. AFTER FEW MORE REMINDERS THESE WILL BE PUT INTO RESTRICTED LIST AND WON'T BE ALLOWED TO ESTABLISH NETWORK ATTACHMENT OR DATA SESSION. |

DYNAMIC PERMIT/DENY UE/REALM LIST UPDATE AND COST OPTIMIZATION BASED ON NETWORK ATTACH FAILURE INCIDENTS

TECHNICAL FIELD

The present disclosure relates to user equipment (UE) roaming.

BACKGROUND

A control center (CC) that communicates with wireless networks performs authentication and authorization on behalf of the wireless networks when wireless devices roam across and attempt to attach to the roaming networks. Nowadays, a control center production environment logs millions of wireless device authentication and authorization failure incidents annually. With the advent of new services that expand roaming, such as Open Roaming, the number of authentication and authorization failure incidents is expected to increase significantly as more and more mobile user equipment (UE)/Internet-of-Thing (IoT) devices roam across different wireless networks, such as cellular, WiFi®, and private LTE networks, for example. These failures can result in poor quality of service (QoS), network/service outages due to potential attacks, and cost management and optimization issues related to data usage and billing.

BRIEF DESCRIPTION OF THE DRAWINGS

FIG. 3 is an illustration of an anomalous UE list, according to an example embodiment.

FIG. 4 is an illustration of an anomalous UE list that shows a sample alert generated for foreign UEs that have been identified/detected, according to an example embodiment.

DESCRIPTION OF EXAMPLE EMBODIMENTS

Overview

A control center residing in a home network performs a method. Upon receiving, from access networks, attach requests initiated by user equipments (UEs) when the UEs attempt to connect to the access networks, the control center computes a baseline attach failure rate for fulfilling the attach requests. The control center initially sets a billing type for a UE of a subscriber to usage based billing. Upon receiving, from the access networks, attach requests initiated by the UE when the UE attempts to connect to the access networks, the control center computes an individual attach failure rate for fulfilling the attach requests from the UE. The control center determines whether the individual attach failure rate for the UE exceeds the baseline attach failure rate. When the individual attach failure rate exceeds the baseline attach failure rate, the control center automatically switches the billing type for the UE to flat rate billing.

EXAMPLE EMBODIMENTS

Figure 1:
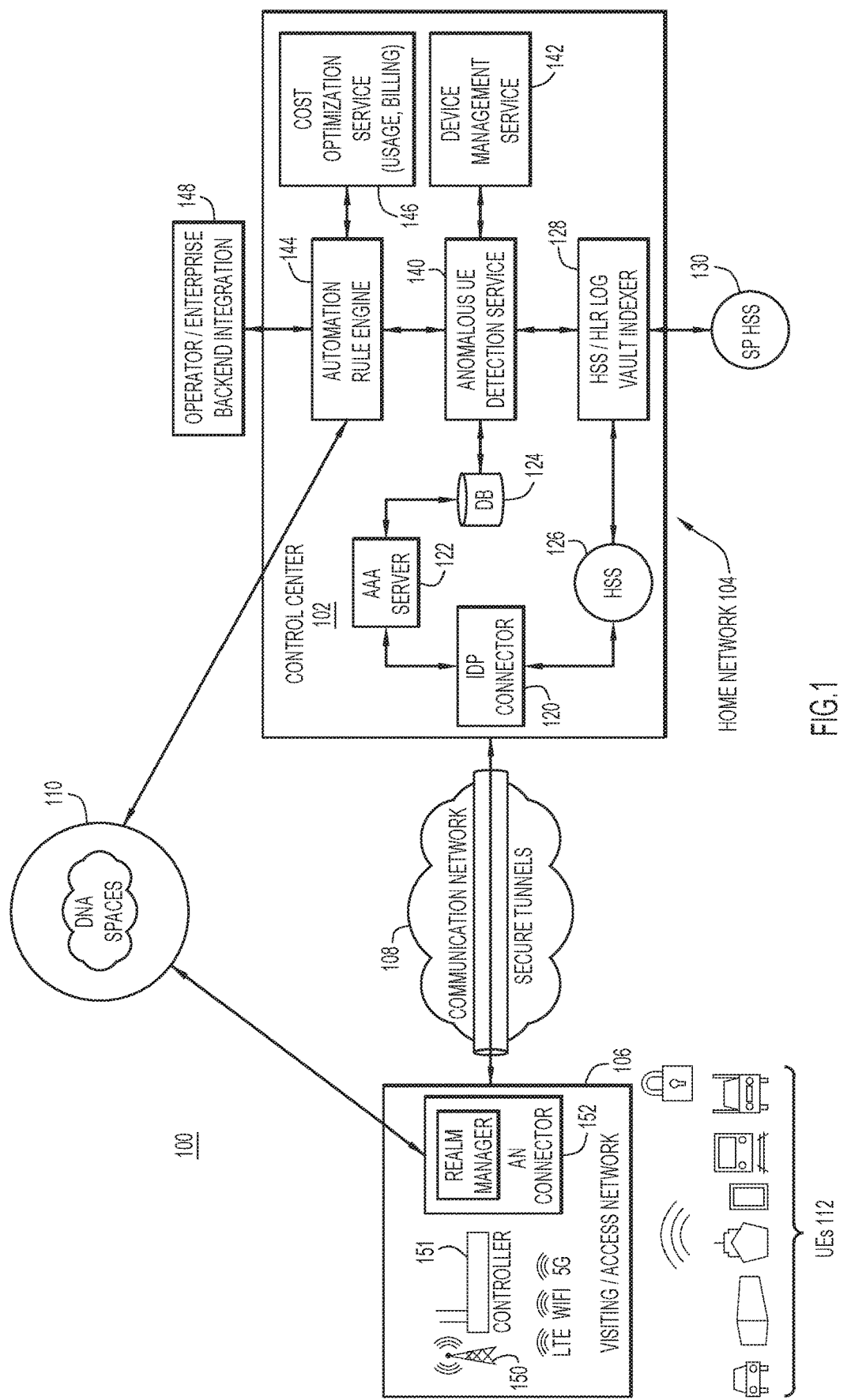
FIG. 1 is a block diagram of a system in which dynamic permit/deny list updates and cost optimization for user equipments (UEs) based on network attach failures of the UEs may be implemented, according to an example embodiment.

With reference to FIG. 1, there is shown a block diagram of an example system 100 in which dynamic permit/deny list updates and cost optimization for user equipment based on network attach failures of the user equipment may be implemented. System 100 includes a cloud-based control center (CC) 102 on a home network 104, an access network 106 (also referred to as a "visiting network" and a "roaming network"), a communication network 108 over which the control center/home network and the access network communicate with each other (e.g., using secure links or tunnels), and UEs 112 that connect wirelessly with the access network. Control center 102 and access network 106 may each access a Digital Network Architecture (DNA) Spaces service 110. DNA Spaces service 110 is a cloud-based location services platform that tracks how UEs move throughout a geographical region and physical space. For convenience, only one access network is shown in FIG. 1. In practice, there are many access networks that communicate with control center 102/home network 104. Mobile devices, wireless communication devices (or simply "wireless devices"), IoT devices, wireless client devices, subscriber devices, user devices, and so on are collectively referred to as user equipments (UEs), and singularly referred to as UE. UE may include, for example, a mobile device, mobile phone, a smartphone, a laptop computer, a tablet computer, a personal computer, a wireless sensor, a radio frequency (RF) tag, an IoT device, and so on.

Control center 102/home network 104 and access network 106 may belong to an Open Roaming federation. The Open Roaming federation links together access providers (e.g., providers of WiFi, 5G, and cellular access networks, for example) and trusted identity providers (such as service providers, UEs, cloud providers, and enterprises) to permit seamless roaming by the UEs across the access networks operated by the access providers. The aforementioned members of the Open Roaming federation register authentication and authorization credentials with control center 102/home network 104, which then authenticates and authorize UEs on behalf of the access networks as the UEs roam seamlessly across and attach to the access networks during calls.

Control center 102 hosts or communicates with a collection of components that interact with each other to implement the embodiments presented herein. The components may include cloud-based services and/or applications hosted on one or more servers, for example. The components include an identity (ID) provider (IDP) connector 120 that provides an interface through which the components of control center 102/network 104 communicate with access network 106 over secure tunnels via network 108, an Authentication, Authorization, and Accounting (AAA) server 122 to perform authentication and authorization of UEs (e.g., UEs 112) on behalf of access networks (e.g., access network 106) responsive to requests from the UEs to attach to the access networks. AAA server 122 stores results of the authentication and authorization of the UEs in a database 124 of control center 102. Control center 102 may also include a Home Subscriber Server (HSS) 126 (which may be combined with a Home Location Register (HLR), not shown) that stores information for UE subscribers authorized on home network 104, such as telephone numbers, addresses, current location, UE identifiers (e.g., international mobile subscriber identities (IMSIs), subscriber profiles (including configured subscriber services), and so on. HSS 126 stores information to and accesses information from an HSS/HLR log vault indexer 128. In addition, an external service provider (SP) HSS 130 may interface with HSS/HLR log vault indexer 128.

Control center 102 also include an anomalous UE detection (AUED) service 140 that access information from database 124 to perform embodiments presented herein, a device management service 142 that communicates with the AUED service, an automation rule engine 144 configured to communicate with the AUED service and DNA spaces 110, and a cost optimization service 146 to communicate with the automation engine and configured to implement embodiments presented herein. Supervisory/administrative entities 148 may interface with and configure the various components of control center 102. Entities 148 may include administrators/operators/enterprise operations (such as backend integration) external to control center 102, as well as administrators/operators of the control center.

Access network 106 provides wireless access/connectivity to UEs 112 over wireless/air interfaces, as is known. For example, access network 106 may operate in accordance with any wireless standard, such as the 802.11 WiFi® and cellular standards. To this end, access network 106 includes a radio access infrastructure or equipment 150 to communicate with UEs 112 over the air interfaces, a controller 151 (such as a wireless local area network (WLAN)), and an access network (AN) connector 152 that serves as an interface through which the radio access infrastructure and controller of the access network communicate with IDP connector 120 of control center 102 (via network 108). AN connector 152 may include a Realm Manager to enforce permit/deny access operations, and a Representational State Transfer (REST) interface to send packets to and receive packets from network 108.

At a high level, access network 106 forwards to home network 104/control center 102 (via AN connector 152 and IDP connector 120) network attach requests received from UEs 112 that roam to and attempt to connect to the access network. In turn, AAA server 122 performs authentication and authorization of the UEs on behalf of access network 106 responsive to the network attach requests. AAA server 122 logs into database 124 results of the authorization and authorization associated with the UEs. HSSs 126 and 130 may also participate with AAA server 122 in the authentication and authorization of the UEs, and may store results associated with these actions in HSS/HLR log vault indexer 128. Thus, over time, database 124 and HSS/HLR log vault indexer 128 collectively store historical data or information indicative of the successes and failures (e.g., failure incidents) of the network attach requests, including success and failures of authentication and authorization of the UEs. AUED service 140 detects anomalous UEs among UEs 112, for example, based on the historical information stored in database 124 and HSS/HLR log vault indexer 128 related to the network attach failures, as described below.

Figure 2:
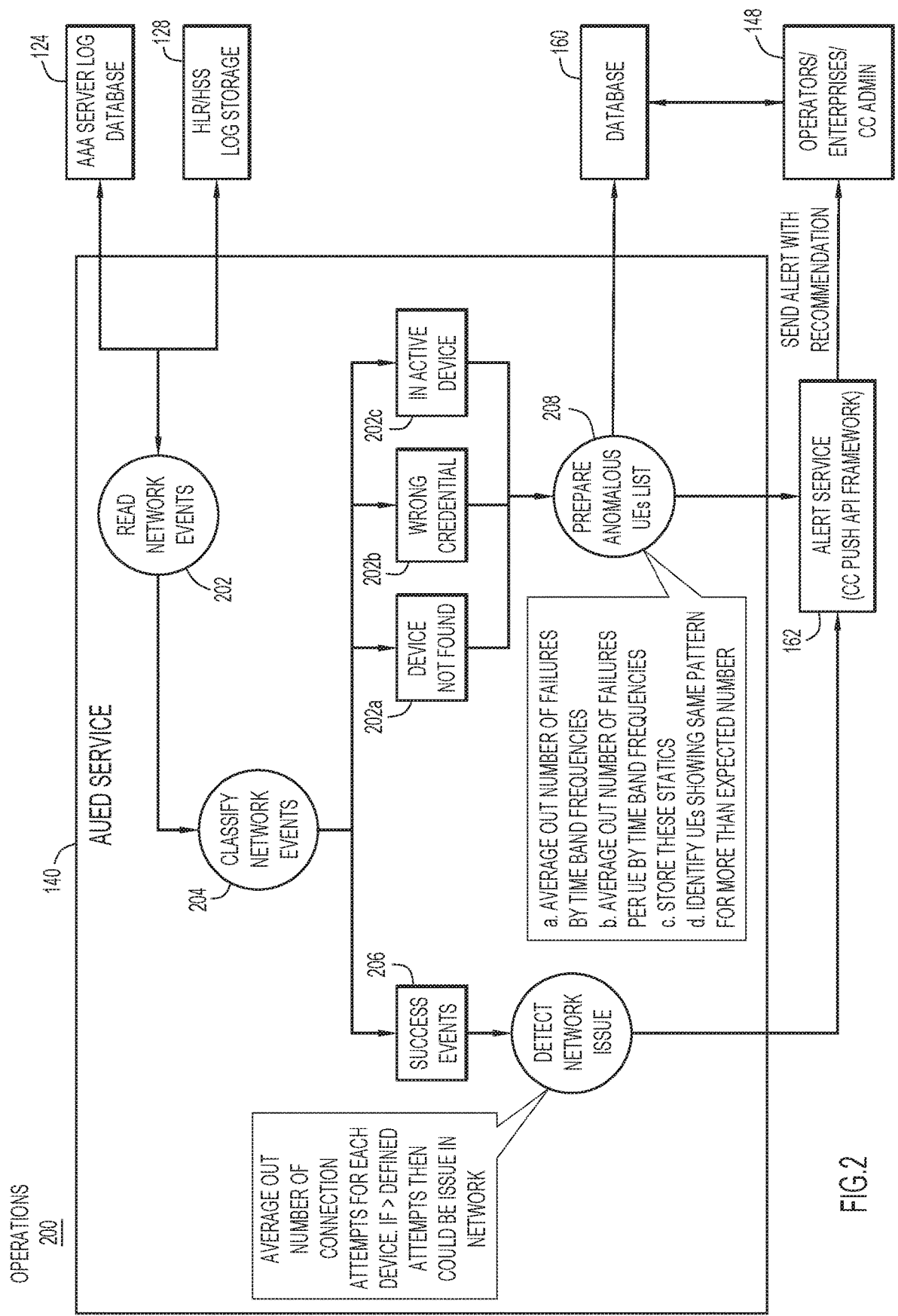
FIG. 2 shows operations performed by an anomalous UE detection (AUED) service of a control center of the system to detect anomalous UEs based on authentication/authorization, according to an example embodiment.

With reference to FIG. 2, there are shown operations 200 performed by AUED service 140 to detect anomalous UEs among UEs 112, for example, by analyzing authentication and authorization results/network events received in connection with AAA server 122, HSS 126, and/or SP HSS 130 (and their embedded HLRs, for example).

At 202, AUED service 140 periodically executes collection actions to fetch network events comprising (i) the historical authentication and authorization failure events/incidents from database 124 received from AAA server 122 as Remote Authentication Dial-In User Service (RADIUS) logs, and (ii) HLR/HSS failure events/incidents from HSS/HLR log vault indexer 128 found as a result of performing elastic searches on the indexer. Failure events/incidents representing unauthorized network accesses by a UE may occur, for example, when (i) the UE is a foreign device that does not belong to home network 104, (ii) the UE is consider an inactive device in control center 102 because configurations of the UE are not synchronized between the control center and other network elements, (iii) HSS/HLR failures, possibly due to configuration mismatches between HSSs 126/130 (and the HLRs) and other network services, and (iv) missing attributes/invalid requests due to misconfigurations on the UE that cause the UE to send incorrect information in AAA requests.

At 204, AUED service 140 classifies or categorizes the network events from 202 according to different failure codes, including Device Not Found (202a), Wrong Credentials (202b), InActive Device (202c), for example.

At 206, AUED service 140 classifies success events, i.e., authorization successes of UEs. That is, AUED service 140 performs analysis of historical network attach successes for the UEs. For example, AUED service 140 analyzes the frequencies of individual UE network attaches (i.e., access network connects) that are successful. If the frequency of successful network attaches is more than an average frequency, this may be due to a network outage, for example. In that case, AUED service 140 alerts entities 148 to rectify the possible network outage.

At 208, AUED service 140 performs analysis of the failure events/incidents as classified/categorized, and generates statistics based on the analysis. AUED service 140 may employ machine learning (ML)/artificial intelligence (AI) techniques and other analysis algorithms to analyze the failure events/incidents. AUED service 140 generates a list of anomalous UEs (i.e., an anomalous UE list) based on the statistics/analysis. The anomalous UE list includes information about each UE on the list (e.g., UE specific identifiers, subscriber information, specific domain names or realms associated with the UE identifiers, and so on) and an indication that each UE is anomalous. The anomalous UE list may also specifically identify anomalies and provide recommended actions. AUED service 140 sends the anomalous UE list to one or more databases 160 accessible to entities 148. AUED service 140 may also send the anomalous UE list to an application programming interface (API) service 162, which then alerts entities 148 with the list.

To generate the anomalous UE list, AUED service 140 may perform the following operations, for example:

a. Determine/compute a baseline number of network attach failures for fulfilling network attach requests across all of the UEs. In an example, the baseline number may be an average number of the network attach failures across all of the UEs. The baseline number of network attach failures include a number of authentication and authorization failures for the UEs. The numbers may be computed over/based on certain predetermined time periods or bands, e.g., over the last 24 hours, the last 7 days, the last 1 month, the last 6 months, and so on, to produce baseline network attach failure rates for fulfilling the network attach requests from the UEs.

b. Determine/compute an individual number of network attach failures for fulfilling network attach requests for each UE, i.e., per UE. In an example, the individual number may be an average individual number of the network attach failures per UE. The individual number of network attach failures may include an individual number of authentication and authorization failures per UE. The number may be computed over/based on certain predetermined time periods or bands, e.g., over the last 24 hours, the last 7 days, the last 1 month, the last 6 months, and so on, to produce network attach failure rates for fulfilling the network attach requests per UE.

c. Compare each of the individual network attach failure rates of the UEs against the baseline network attach failure rate (e.g., a threshold that is based on the baseline network attach failure rate). Based on results of compare, declare/mark each UE having an individual network attach failure rate that deviates significantly from (e.g., exceeds by 50% or more) the baseline network attach failure rate as an anomalous UE. For example, if the average number of network attach failures for all UEs in a 24 hours band is 1-2, any UE having a daily average of network attach failures of 10 may be marked as anomalous if the trend continues for 7 days.

d. Mark as anomalous UEs that exhibit consistent failure patterns (including the pattern described in (c)), and share this information with control center support admin/operator/enterprise for further review based on the category of the failures.

With reference to FIG. 3, there is an illustration of an example anomalous UE list 300 depicted as a table in human readable form. Anomalous UE list 300 captures a sample alert that informs entities 148 about identified anomalies and recommended actions. Anomalous UE list 300 includes a first column to identify anomalous UEs (or subscriber identification modules (SIM)), a second column that provides an operator name/ID, a third column that identifies an enterprise name/ID, a fourth column that identifies a cause of failure, and a fifth column that provides a recommended action with respect to the anomalous UEs.

When foreign UEs attempt to establish data session, identities of the foreign UEs are not found by control center 102, which may be classified as a different type of failure incident than those shown in FIG. 3. With reference to FIG. 4, there is an illustration of an example anomalous UE list 400 that shows a sample alert generated for foreign UEs that have been identified/detected. Anomalous UE list 400 includes a first column to identify anomalous UEs (or subscriber identification modules (SIM)), a second column that identifies a cause of failure, and a third column that provides a recommended action. The operator and enterprise names are unknown and thus omitted.

Entities 148 may wish to allow/deny traffic from specific domains and/or UEs that are problematic. Accordingly, armed with the anomalous UE list provided by AUED service 140, the entities may generate one or more permit/deny lists for the UEs that indicate/define which of the UEs should be permitted/denied access to which of the access networks. A permit/deny list lists identities of UEs and/or domains with corresponding permit/deny instructions to be applied to the UEs. A permit instruction indicates that the corresponding UE/domain should be permitted access, while a deny instruction indicates that the corresponding UE/domain should be denied access. Entities 148 may generate each permit/deny list manually, or automatically, based on the anomalous UE list. In addition, AUED service 140 may generate the permit/deny lists. In the example of FIG. 1, entities 148/control center 102 may send a given permit/deny list to access network 106 through AN connector 152. More specifically, the permit/deny list may be sent to access network 106 through the REST interface of AN connector 152.

Once AN connector 152 receives the permit/deny list, access network 106 may use the list to permit/deny access to UEs attempting to connect to the access network. Also, AN connector 152 may reject UEs attempting access that are denied such access by the list, which has the advantage of further reducing malicious traffic sent to home network 104. In addition, AN connector 152 may dynamically update, e.g., add and delete entries on, the list over time for UEs that may attempt future attach requests.

Embodiments implemented in control center 102 also perform cost optimization. The cost optimization leverages automation rules configured on cost optimization service 146 and automation rules engine 144 to switch a billing type for UEs between flat rates to usage based rates based on successful connections vs. usage. For example, a default billing type for a UE associated with a subscriber may be usage based billing, i.e., billing for usage based on a billing rate plan. When connection failures for the UE are detected, the UE can be moved from the usage based billing to flat rate billing (i.e., per-connection based billing). Then, the billing type may be switched back to the usage based billing, when successful connections are detected, as described below.

Figure 5:
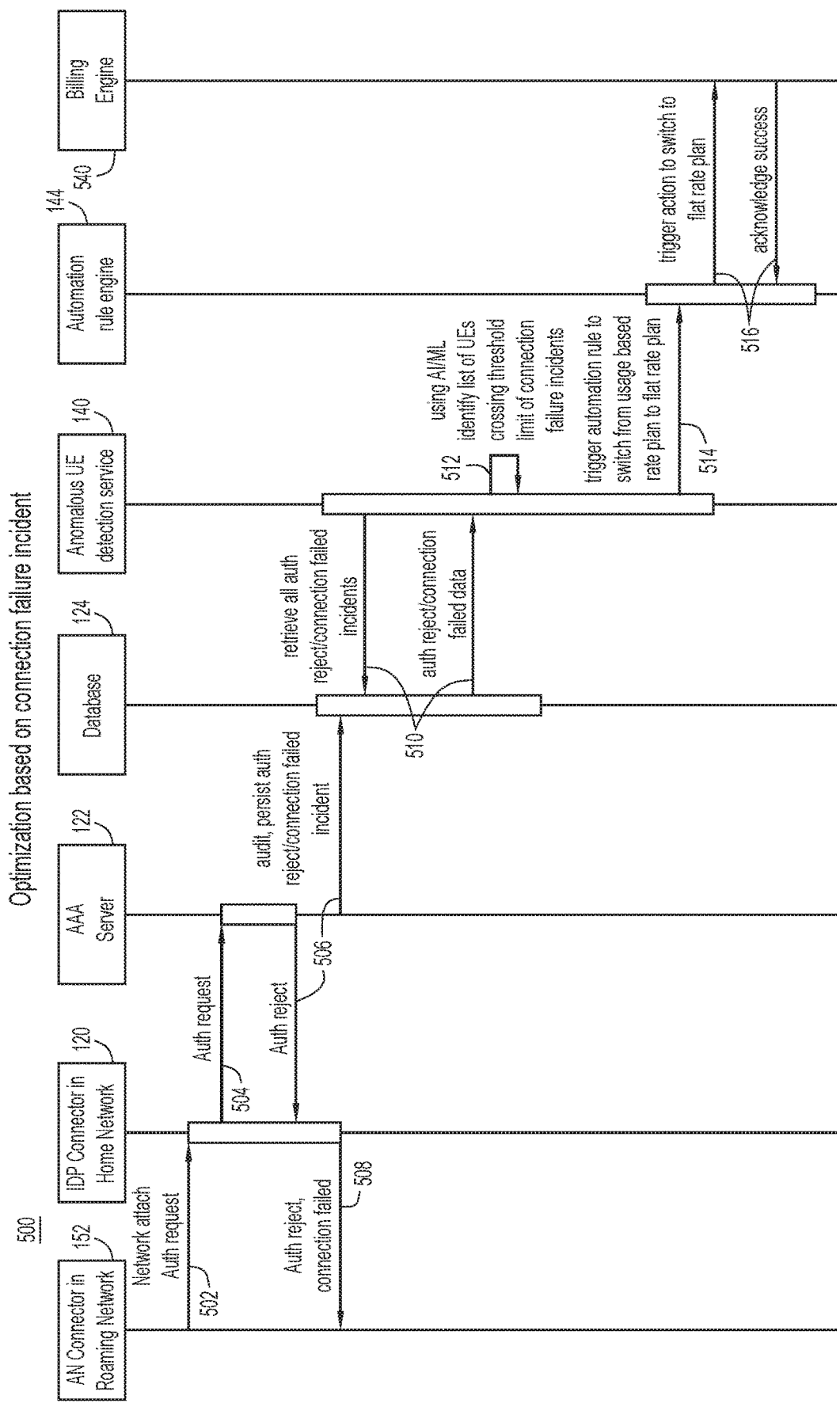
FIG. 5 is a transaction diagram of a method of cost optimization performed by the control center, according to an example embodiment.

With reference to FIG. 5, there is a transaction diagram of an example method 500 of cost optimization performed by control center 102.

In a background operation (not shown), that occurs prior to operation 502 described below, a billing type for/associated with a given UE may be set to usage based billing. The billing type may also be indicated to automation rule engine 144. Usage based billing may be a default billing type configured for a subscriber associated with the given UE. When the given UE successfully establishes a session, the usage based billing is applied to the session. That is, a duration of the session is recorded and, when the session terminates, a subscriber associated with the UE session is billed according to a billing rate plan based on the duration.

At 502, responsive to access network 106 receiving a network attach request from the given UE, AN connector 152 forwards the network attach request to IDP connector 120, which receives the request. At 504, IDP connector 120 forwards the request to AAA server 122, which performs authentication and authorization of the given UE on behalf of access network 106. In the example, the authentication and authorization of the given UE fails and, at 506, AAA server 122 forwards an authentication reject for the given UE to IDP connector 120, and also logs the authentication reject as a failure incident for the given UE in database 124. In turn, at 508, IDP connector 120 forwards the authorization reject to AN connector 152. Operations 502-508 repeat over time. Moreover, operations similar to operations 502-508 are repeated for a population of UEs over time. In some instances, network attaches requests for the UEs may be fulfilled successfully.

At 510, AUED service 140 retrieves all of the authorization reject/connection failed incidents (i.e., network attach request failed incidents) for all UEs from database 124. At 512, AUED service 140 performs operations 208(a)-208(d) and 206 described above in connection with FIG. 2. As a result, AUED service 140 constructs a list of UEs (i.e., UE identities) having individual network attach failure rates (e.g., based on individual authentication and authorization failure rates) that cross a network attach failure rate threshold limit computed based on all UEs (e.g., based on an average baseline network attach failure rate across all UEs, as described above). The list of UEs may represent the anomalous UE list discussed above. This example assumes that the given UE is on the list, i.e., the individual network attach failure rate for the given UE exceeds the threshold limit, and the UE is marked as an anomalous UE.

Because the individual network attach failure rate of the given UE exceeds the threshold limit, at 514, AUED service 140 signals automation rule engine 144 to switch the billing type for the given UE from usage based billing to a flat rate billing, also referred to as "per-connection based billing." Under flat rate billing, the subscriber is billed a fixed amount each time the given UE successfully establishes a session, i.e., each time a network attach request for the UE is fulfilled successfully. At 516, automation rule engine 144 triggers an action in a billing engine 540 to switch to/implement the flat rate billing, and the billing engine acknowledges the switch in billing.

After 516, AUED service 140 may receive repeated subsequent network attach requests from the given UE, and may repeatedly perform operations 208(a)-208(d) and 206. As a result, AUED service 140 may determine that the individual network attach failure rate for the given UE has fallen back below the threshold limit. In that case, AUED service 140 signals automation rule engine 144 to switch the billing type of the given UE from the flat rate billing back to the usage based billing. In turn, automation rule engine 144 signals the switch to billing engine 540, which implements the switch.

Figure 6:
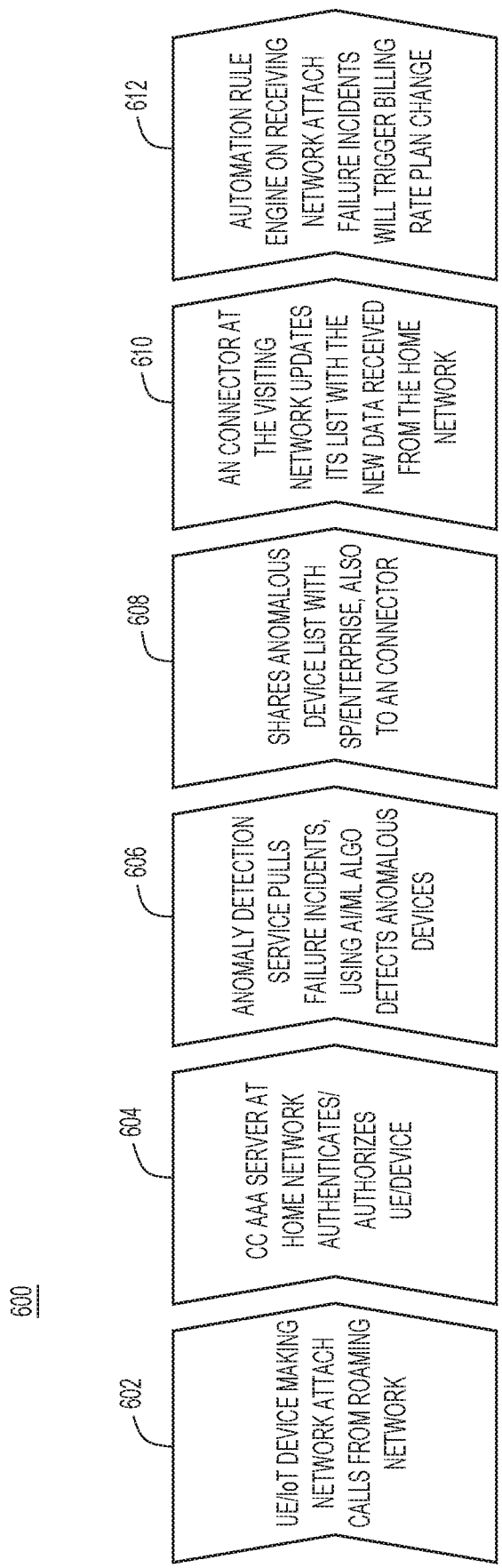
FIG. 6 shows a high level call flow implemented between various services of the system of FIG. 1, according to an example embodiment.

With reference to FIG. 6, there is shown an example high level call flow 600 implemented between various services described herein. At 602, a UE initiates network attach requests to access network 106 (e.g., a roaming network), and the access network forwards the network attach request to control center 102. At 604, AAA server 122 at control center 102 of home network 104 authenticates/authorizes the UE. At 606, AUED service 140 at control center 102 pulls network attach failure incidents from various databases. AUED service 140 may use ML/AI and/or other analysis algorithms to detect anomalous UEs (which may include the aforementioned UE) to produce an anomalous UE list. At 608, AUED service 140 shares the list, in the form of a permit/deny access list, for example, with a relevant service provider/enterprise, and with AN connector 152 in access network 106. At 610, AN connector 152 at access network 106 updates its existing, normally static, permit/deny list with the new permit/deny list from home network 104. At 612, network attach failure incidents on access network 106 trigger billing rate plan changes for the UE based on an individual network attach failure rate for the UE and an overall/baseline network attach failure rate for all UEs.

Figure 7:
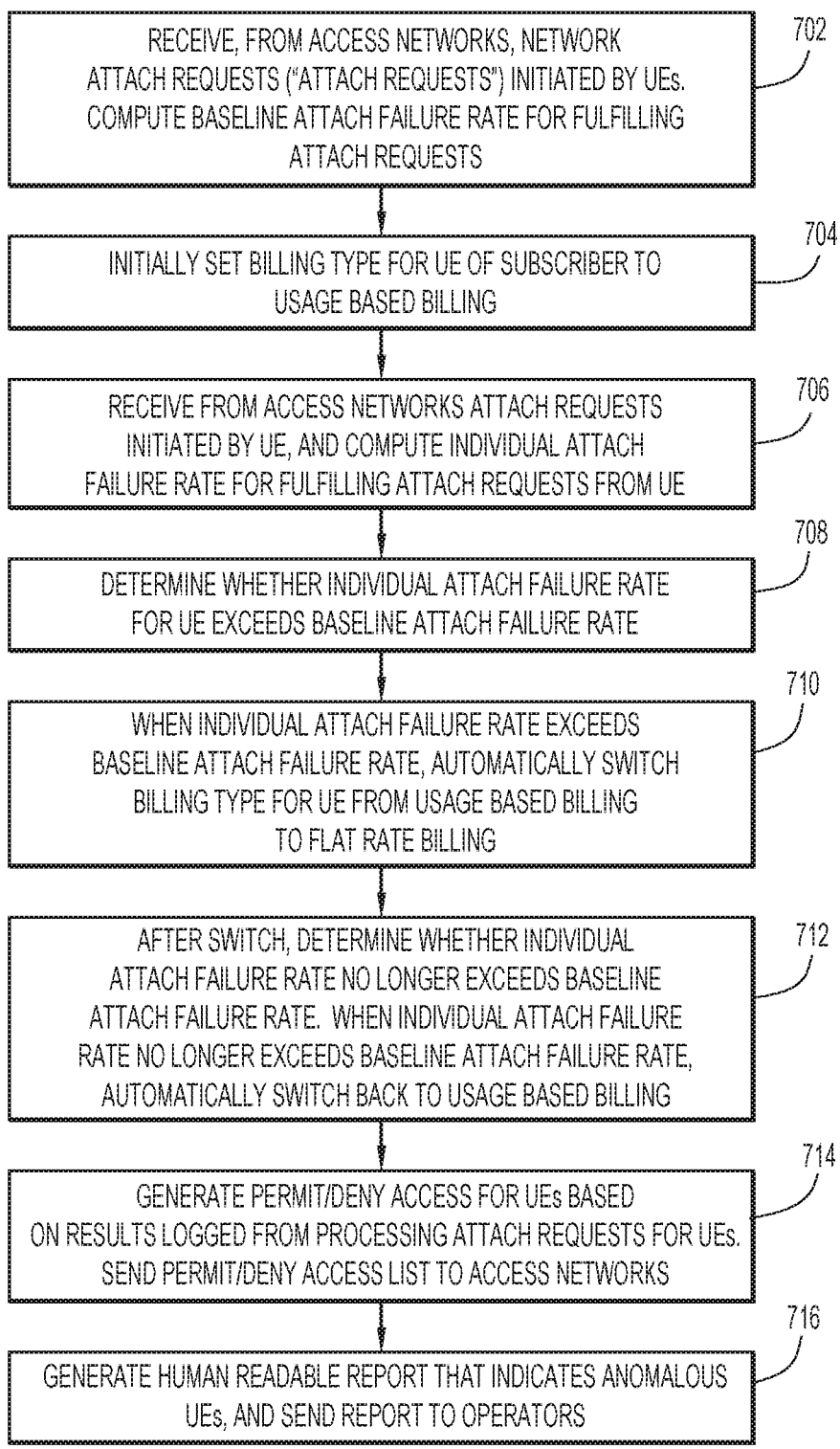
FIG. 7 is a flowchart of a method of performing cost optimization performed by the control center, according to an example embodiment.

With reference to FIG. 7, there is a flowchart of an example method 700 of performing cost optimization performed by a control center (CC) of a home network. Method 700 includes operations described above. In the ensuing description, the term "network attach" may be referred to simply as "attach."

At 702, upon receiving, from access networks that are wireless, attach requests initiated by UEs when the UEs attempt to connect wirelessly to the access networks (e.g., when the UEs roam to the access networks), the CC processes, i.e., attempts to fulfill, the attach requests and logs results (e.g., results for authentication/authorization successes and failures). Based on the logged results, the CC computes a baseline attach failure rate (e.g., an average attach failure rate) for fulfilling the attach requests across all of the UEs. The baseline attach failure rate may be based on a baseline authentication/authorization failure rate.

At 704, a billing type for a UE (e.g., for a particular UE) of a subscriber is initially set to usage based billing. The CC may configure the billing type in a database, for example.

At 706, upon receiving, from the access networks, attach requests initiated by the (particular) UE when the UE attempts to connect to the access networks (e.g., roams to the access networks), the CC computes an individual attach failure rate (e.g., an average individual attach failure rate) for fulfilling the attach requests from the UE. The individual attach failure rate may be based on an individual authentication/authorization failure rate.

At 708, the CC determines whether the individual attach failure rate for the UE exceeds the baseline attach failure rate, e.g., exceeds a threshold that is based on the baseline attach failure rate.

At 710, when the individual attach failure rate exceeds the baseline attach failure rate, the CC automatically (i.e., without manual intervention) switches the billing type for the UE from the usage based billing to flat rate billing (i.e., per-connection based billing). Otherwise, the CC maintains the usage based billing.

At 712, after the switch to the flat rate billing, the CC determines whether the individual attach failure rate no longer exceeds the baseline attach failure rate. When the individual attach failure rate no longer exceeds the baseline attach failure rate, the CC automatically switches the billing type back to the usage based billing. Otherwise, the CC maintains the per-connection based billing.

At 714, the CC generates a permit/deny access list for the UEs based on the logged results. The permit/deny access list for the UEs indicates which of the UEs should be permitted/denied access to the access networks. The CC sends the permit/deny access list to the access networks. The permit/deny access list may include an access control list (ACL) for the UEs listed.

At 716, the CC generates a human readable report that indicates anomalous UEs, based on the logged results. The human readable report lists identifiers of the anomalous UEs, reasons for network attach failures, and recommended actions related to the failures. The CC may generate a display of the report.

Figure 8:
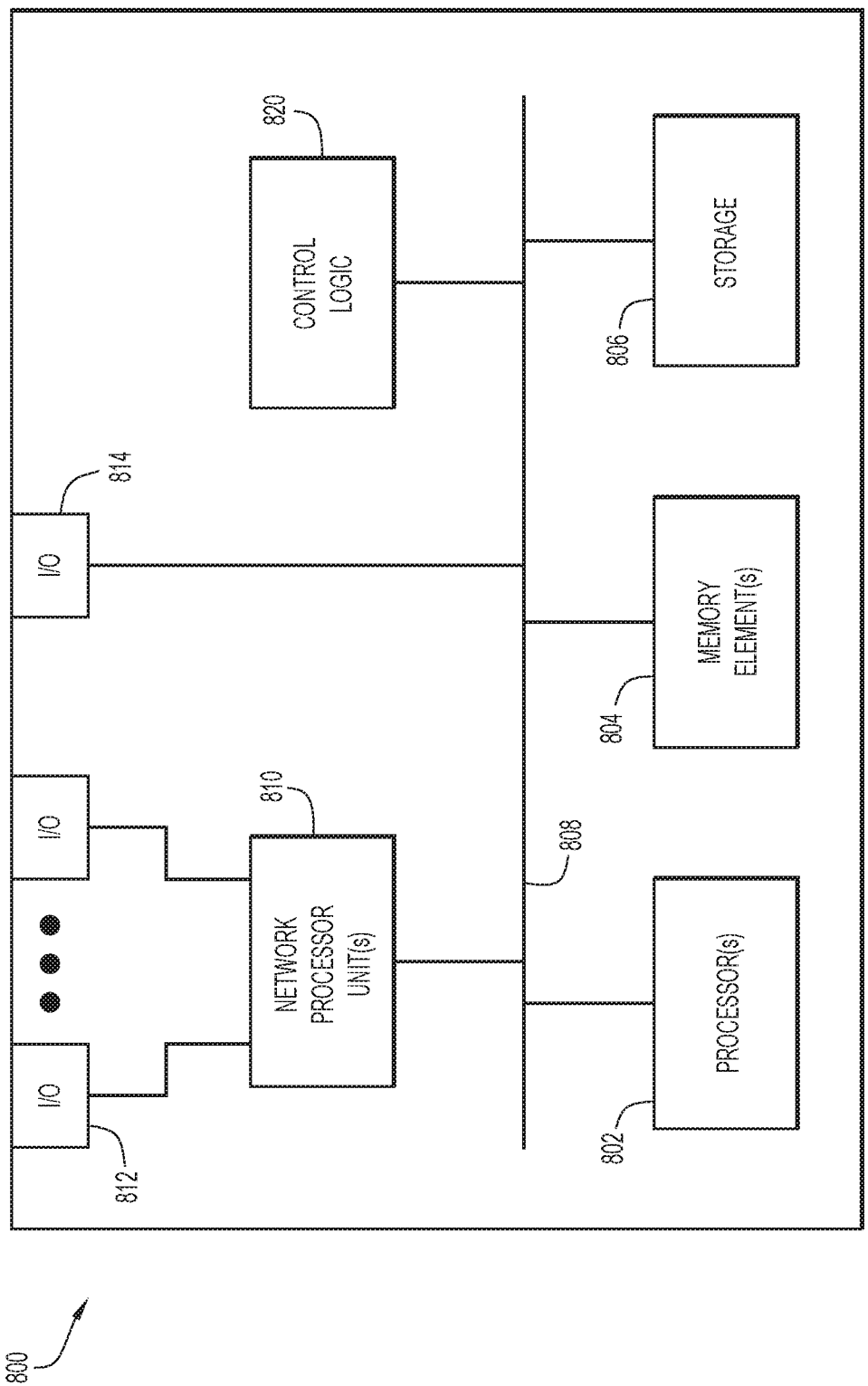
FIG. 8 is a hardware block diagram of a computing device that may perform functions associated with operations in connection with embodiments presented herein, according to an example embodiment.

Referring to FIG. 8, FIG. 8 illustrates a hardware block diagram of a computing device 800 that may perform functions associated with operations discussed herein in connection with the embodiments presented herein. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 8 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 8) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, embodiments presented herein:
a. Use AI/ML to categorize session initialization failures and provide analytics reports to appropriate administrative entities (e.g., a control center, support administrators, service provider administrators, and/or enterprise administrators) to alert the entities of anomalies identified and provide recommended actions. As the control center is an integral part of operators/enterprises system, it becomes a centralized system where all success and failures can be monitored, so there is no need to introduce new software/hardware tools/components at their core network elements.
b. Add a service/interface to define a permit/deny list based on the analysis of the network events by operators and/or enterprises.
c. Add a REST service to an Open Roaming connector to accept permit/deny list on top of the static deny list configured at the time of connector deployment. The Open Roaming connector dynamically updates the static list to block traffic from malicious devices.
d. Perform cost optimization, which leverages a control center automation rules framework to switch between rate plans for the subscriber depending upon successful network connection vs. usage based rate plan.

In one aspect, a method is provided comprising: at a control center residing in a home network: upon receiving, from access networks, attach requests initiated by user equipments (UEs) when the UEs attempt to connect to the access networks, computing a baseline attach failure rate for fulfilling the attach requests; initially setting a billing type for a UE of a subscriber to usage based billing; upon receiving, from the access networks, attach requests initiated by the UE when the UE attempts to connect to the access networks, computing an individual attach failure rate for fulfilling the attach requests from the UE; determining whether the individual attach failure rate for the UE exceeds the baseline attach failure rate; and when the individual attach failure rate exceeds the baseline attach failure rate, automatically switching the billing type for the UE to flat rate billing.

In another aspect, an apparatus is provided comprising: a network processor unit to communicate with one or more networks; and a processor configured to perform: upon receiving, from access networks, attach requests initiated by user equipments (UEs) when the UEs attempt to connect to the access networks, computing a baseline attach failure rate for fulfilling the attach requests; initially setting a billing type for a UE of a subscriber to usage based billing; upon receiving, from the access networks, attach requests initiated by the UE when the UE attempts to connect to the access networks, computing an individual attach failure rate for fulfilling the attach requests from the UE; determining whether the individual attach failure rate for the UE exceeds the baseline attach failure rate; and when the individual attach failure rate exceeds the baseline attach failure rate, automatically switching the billing type for the UE to flat rate billing.

In yet another aspect, a non-transitory compute readable medium is provided. The medium is encoded with instructions that, when executed by a processor configured to communicate with one or more networks, cause the processor to perform: upon receiving, from access networks, attach requests initiated by user equipments (UEs) when the UEs attempt to connect to the access networks, computing a baseline attach failure rate for fulfilling the attach requests; initially setting a billing type for a UE of a subscriber to usage based billing; upon receiving, from the access networks, attach requests initiated by the UE when the UE attempts to connect to the access networks, computing an individual attach failure rate for fulfilling the attach requests from the UE; determining whether the individual attach failure rate for the UE exceeds the baseline attach failure rate; and when the individual attach failure rate exceeds the baseline attach failure rate, automatically switching the billing type for the UE to flat rate billing.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
at a control center residing in a home network:
upon receiving, from access networks, attach requests initiated by user equipments (UEs) when the UEs attempt to connect to the access networks, computing a baseline attach failure rate for fulfilling the attach requests;
initially setting a billing type for a UE of a subscriber to usage based billing;
upon receiving, from the access networks, attach requests initiated by the UE when the UE attempts to connect to the access networks, computing an individual attach failure rate for fulfilling the attach requests from the UE;
determining whether the individual attach failure rate for the UE exceeds the baseline attach failure rate; and when the individual attach failure rate exceeds the baseline attach failure rate, automatically switching the billing type for the UE to flat rate billing.

2. The method of claim 1, further comprising:
after the automatically switching to the billing type to flat rate billing, when the individual attach failure rate no longer exceeds the baseline attach failure rate, automatically switching the billing type back to the usage based billing.

3. The method of claim 1, wherein:
the computing the baseline attach failure rate includes computing an average attach failure rate for the UEs over a predetermined time period; and
the computing the individual attach failure rate includes computing an average individual attach failure rate for the UE over the predetermined time period.

4. The method of claim 1, wherein:
the computing the baseline attach failure rate includes computing the baseline attach failure rate based on authorization/authentication failures for the UEs as indicated by an Authentication, Authorization, and Accounting (AAA) server hosted in the home network; and
the computing the individual attach failure rate includes computing the individual attach failure rate based on authorization/authentication failures for the UE as indicated by the AAA server.

5. The method of claim 1, further comprising:
responsive to the attach requests from the UEs, performing authentication/authorization of the UEs on behalf of the access networks;
logging authentication/authorization results from the performing;
based on the authentication/authorization results, generating a permit/deny list for the UEs that indicates which of the UEs should be permitted/denied access to the access networks; and
sending the permit/deny list to the access networks.

6. The method of claim 5, wherein:
the generating the permit/deny list includes detecting anomalous UEs among the UEs based on failure incidents in the authentication/authorization results, and adding deny entries to the permit/deny list to indicate that the anomalous UEs should be denied access to the access networks.

7. The method of claim 6, further comprising:
generating a human readable report that indicates the anomalous UEs and provides a recommended action with respect to the anomalous UEs.

8. The method of claim 5, wherein:
the sending includes sending the permit/deny list to Representational State Transfer (REST) interfaces in the access networks.

9. An apparatus comprising:
a network processor unit to communicate with one or more networks; and
a processor coupled to the network processor unit and configured to perform:
upon receiving, from access networks, attach requests initiated by user equipments (UEs) when the UEs attempt to connect to the access networks, computing a baseline attach failure rate for fulfilling the attach requests;
initially setting a billing type for a UE of a subscriber to usage based billing;
upon receiving, from the access networks, attach requests initiated by the UE when the UE attempts to connect to the access networks, computing an individual attach failure rate for fulfilling the attach requests from the UE;
determining whether the individual attach failure rate for the UE exceeds the baseline attach failure rate; and
when the individual attach failure rate exceeds the baseline attach failure rate, automatically switching the billing type for the UE to flat rate billing.

10. The apparatus of claim 9, wherein the processor is further configured to perform:
after the automatically switching to the flat rate billing, when the individual attach failure rate no longer exceeds the baseline attach failure rate, automatically switching the billing type back to the usage based billing.

11. The apparatus of claim 9, wherein:
the processor is configured to perform the computing the baseline attach failure rate by computing an average attach failure rate for the UEs over a predetermined time period; and
the processor is configured to perform the computing the individual attach failure rate by computing an average individual attach failure rate for the UE over the predetermined time period.

12. The apparatus of claim 9, wherein:
the processor is configured to perform the computing the baseline attach failure rate by computing the baseline attach failure rate based on authorization/authentication failures for the UEs as indicated by an Authentication, Authorization, and Accounting (AAA) server hosted in a home network among the one or more networks; and
the processor is configured to perform the computing the individual attach failure rate by computing the individual attach failure rate based on authorization/authentication failures for the UE as indicated by the AAA server.

13. The apparatus of claim 9, wherein the processor is further configured to perform:
responsive to the attach requests from the UEs, performing authentication/authorization of the UEs on behalf of the access networks;
logging authentication/authorization results from the performing;
based on the authentication/authorization results, generating a permit/deny list for the UEs that indicates which of the UEs should be permitted/denied access to the access networks; and
sending the permit/deny list to the access networks.

14. The apparatus of claim 13, wherein:
the processor is configured to perform the generating the permit/deny list by detecting anomalous UEs among the UEs based on failure incidents in the authentication/authorization results, and adding deny entries to the permit/deny list to indicate that the anomalous UEs should be denied access to the access networks.

15. The apparatus of claim 14, wherein the processor is further configured to perform:
generating a human readable report that indicates the anomalous UEs and provides a recommended action with respect to the anomalous UEs.

16. The apparatus of claim 13, wherein:
the processor is configured to perform the sending by sending the permit/deny list to Representational State Transfer (REST) interfaces in the access networks.

17. A non-transitory computer readable medium encoded with instructions that, when executed by a processor configured to communicate with one or more networks, cause the processor to perform:
- upon receiving, from access networks, attach requests initiated by user equipments (UEs) when the UEs attempt to connect to the access networks, computing a baseline attach failure rate for fulfilling the attach requests;
- initially setting a billing type for a UE of a subscriber to usage based billing;
- upon receiving, from the access networks, attach requests initiated by the UE when the UE attempts to connect to the access networks, computing an individual attach failure rate for fulfilling the attach requests from the UE;
- determining whether the individual attach failure rate for the UE exceeds the baseline attach failure rate; and
- when the individual attach failure rate exceeds the baseline attach failure rate, automatically switching the billing type for the UE to flat rate billing.

18. The non-transitory computer readable medium of claim 17, further comprising instructions to cause the processor to perform:
- after the automatically switching to the flat rate billing, when the individual attach failure rate no longer exceeds the baseline attach failure rate, automatically switching the billing type back to the usage based billing.

19. The non-transitory computer readable medium of claim 17, wherein:
- the instructions to cause the processor to perform the computing the baseline attach failure rate include instructions to cause the processor to perform computing an average attach failure rate for the UEs over a predetermined time period; and
- the instructions to cause the processor to perform the computing the individual attach failure rate include instructions to cause the processor to perform computing an average individual attach failure rate for the UE over the predetermined time period.

20. The non-transitory computer readable medium of claim 17, further comprising instructions to cause the processor to perform:
- responsive to the attach requests from the UEs, performing authentication/authorization of the UEs on behalf of the access networks;
- logging authentication/authorization results from the performing;
- based on the authentication/authorization results, generating a permit/deny list for the UEs that indicates which of the UEs should be permitted/denied access to the access networks; and
- sending the permit/deny list to the access networks.

* * * * *